(12) United States Patent
Johnson et al.

(10) Patent No.: US 10,534,375 B2
(45) Date of Patent: *Jan. 14, 2020

(54) GAS INSENSITIVE MASS FLOW CONTROL SYSTEMS AND METHODS

(71) Applicant: Hitachi Metals, Ltd., Minato-ku, Tokyo (JP)

(72) Inventors: Ryan Johnson, Fort Collins, CO (US); Alexei V. Smirnov, Fort Collins, CO (US); Patrick Albright, Wellington, CO (US); Cy Jordan, Fort Collins, CO (US); Arun Nagarajan, San Bruno, CA (US)

(73) Assignee: Hitachi Metals, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,906

(22) Filed: Aug. 9, 2018

(65) Prior Publication Data

US 2018/0348798 A1 Dec. 6, 2018

Related U.S. Application Data

(63) Continuation of application No. 15/386,183, filed on Dec. 21, 2016, now Pat. No. 10,126,761.
(Continued)

(51) Int. Cl.
*G05D 7/06* (2006.01)
*G01F 25/00* (2006.01)

(52) U.S. Cl.
CPC ....... *G05D 7/0635* (2013.01); *G01F 25/0007* (2013.01); *G01F 25/0038* (2013.01)

(58) Field of Classification Search
CPC .. G05D 7/0635; G05D 7/0629; G05D 7/0623; G05D 7/0617; G05D 7/00;
(Continued)

(56) References Cited

U.S. PATENT DOCUMENTS 6,139,640 A   10/2000  Ramos et al.
8,793,082 B2   7/2014  Ding et al.
(Continued)

FOREIGN PATENT DOCUMENTS

CN    105283737 A    1/2016
EP      1333270 A1   8/2003
(Continued)

OTHER PUBLICATIONS

Le, Toan, "Non-Final Office Action Regarding U.S. Appl. No. 15/386,183", dated Mar. 12, 2018, p. 24, Published in: US.
(Continued)

*Primary Examiner* — Toan M Le
(74) *Attorney, Agent, or Firm* — Neugeboren O'Dowd PC

(57) ABSTRACT

Mass flow control systems and methods for controlling the mass flow rate of a gas through a primary conduit are disclosed. One mass flow control system includes a primary conduit for directing a flow of a gas and an adjustment system configured to divert a portion of the gas from the primary conduit to a secondary conduit and provide an adjustment signal that changes when a composition of the gas changes. A mass flow controller is operatively coupled to the primary conduit to control a primary flow rate of the gas. The mass flow controller includes a valve to control the primary flow rate of the gas and a control loop configured to receive the adjustment signal and control the valve to provide the primary flow rate of the gas at a set point.

12 Claims, 8 Drawing Sheets

Related U.S. Application Data

(60) Provisional application No. 62/272,315, filed on Dec. 29, 2015.

(58) Field of Classification Search
CPC .. G01F 25/0038; G01F 25/00; G01F 25/0007; G01F 25/0053; G01F 25/0084; G01F 25/0092

See application file for complete search history.

(56) References Cited

U.S. PATENT DOCUMENTS

| | | | |
|---|---|---|---|
| 10,126,761 B2 * | 11/2018 | Johnson | G01F 25/0007 |
| 2003/0149536 A1 | 8/2003 | Silvis et al. | |
| 2009/0266139 A1 | 10/2009 | Gregor et al. | |
| 2011/0011183 A1 | 1/2011 | Monkowski et al. | |
| 2012/0174992 A1 | 7/2012 | Shajii et al. | |
| 2014/0083514 A1 | 3/2014 | Ding | |
| 2014/0190579 A1 | 7/2014 | Ding | |
| 2015/0121988 A1 | 5/2015 | Banares et al. | |
| 2016/0131511 A1 | 5/2016 | Shirai et al. | |

FOREIGN PATENT DOCUMENTS

| | | |
|---|---|---|
| JP | 05308053 A | 11/1993 |
| JP | 2003287477 A | 10/2003 |
| WO | 2015029890 A1 | 3/2015 |

OTHER PUBLICATIONS

O'Dowd, Sean, "Response to Non-Final Office Action Regarding U.S. Appl. No. 15/386,183", dated May 4, 2018, p. 8, Published in: US.

Fujishima, Kotaro, "International Search Report Re Application No. PCT/JP2016/089028", dated Apr. 4, 2017, p. 8, Published in: JP.

* cited by examiner

GAS INSENSITIVE MASS FLOW CONTROL SYSTEMS AND METHODS

CLAIM OF PRIORITY

The present Application for patent is a Continuation of U.S. patent application Ser. No. 15/386,183, entitled "GAS INSENSITIVE MASS FLOW CONTROLLERS AND METHODS," filed 21 Dec. 2016, which claims priority to Provisional Application No. 62/272,315 entitled "GAS INSENSITIVE MASS FLOW CONTROLLERS AND METHODS," filed 29 Dec. 2015. Both application Ser. No. 15/386,183 and Application No. 62/272,315 are assigned to the assignee hereof and hereby expressly incorporated by reference herein.

FIELD OF THE INVENTION

The present invention relates to systems and methods for mass flow control. In particular, but not by way of limitation, the present invention relates to systems and methods for gas insensitive mass flow control.

BACKGROUND OF THE INVENTION

A typical mass flow controller (MFC) is a device that sets, measures, and controls the flow of a fluid (e.g., a gas or a liquid). An important part of an MFC is a sensor that measures the mass flow rate of a fluid flowing through the device. The MFC compares an output signal of the sensor with a predetermined set point and adjusts a control valve to maintain the mass flow rate of the gas at the predetermined set point.

The mass flow sensor of an MFC is typically calibrated against a precision mass flow meter so that the output signal of the MFC sensor is adjusted (using calibration data) to match the measured flow of the precision mass flow meter. The calibration of mass flow controllers is typically performed by MFC manufacturers with a calibration gas, typically nitrogen ($N_2$). Often, the obtained calibration data is gas-dependent—especially in the context of thermal mass flow sensors. As a consequence, when the MFC is operating with a gas other than the calibration gas, the calibration data may result in the MFC providing a flow rate that does not match the desired set point.

Due to the tendency of mass flow controllers to be inaccurate when the gas that is being controlled varies from the calibration gas, on-tool flow verification systems, such as the system depicted in FIG. 7, have been utilized to provide a reference flow measurement that is compared against the measurement of the MFC. These flow verification systems may utilize periodic pressure-based measurements of flow that are compared to the measurements of the MFC. For example, periodic rate-of-rise or rate-of-decay measurements are known to be utilized to determine whether the measured flow of an MFC has departed from the actual flow by virtue of variations in the composition of the fluid being controlled.

But these rate-of-rise and rate-of-decay systems merely provide reference information (e.g., as an alarm), and they may interfere with the flow of the fluid being controlled. As shown in FIG. 7 for example, a depicted rate of decay system is disposed in the same flow path as a mass flow controller; thus, interfering with the flow of the controlled fluid. Moreover, if the flow rate of the fluid being controlled is very high (e.g., exceeding 100 liters per minute), a very large containment chamber would be required for the rate-of-decay system of FIG. 7 to measure flow accurately. Thus, rate-of-rise and rate-of-decay systems are not typically used in connection with high flow rate systems.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

According to an aspect, a mass flow control system includes a primary conduit for directing a flow of a gas, an adjustment system configured to divert a portion of the gas from the primary conduit to a secondary conduit and provide an adjustment signal that changes when a composition of the gas changes. A mass flow controller is operatively coupled to the primary conduit to control a primary flow rate of the gas. The mass flow controller includes a control loop configured to receive the adjustment signal and control a valve so the gas-corrected flow signal indicates the primary flow rate of the gas through the primary conduit is equal to a set point.

According to another aspect, a mass flow control system for controlling a flow rate of a gas includes means for controlling the flow rate of the gas through a primary conduit with a mass flow controller, means for diverting a portion of the gas to a second conduit, means for producing an assessment flow in the second conduit, means for calculating a first measure of a flow rate of the assessment flow, means for measuring the flow rate of the assessment flow with a mass flow meter that is affected by the composition of the gas to produce a second measure of the assessment flow, and means for generating an adjustment signal based upon a difference between the first measure and the second measure of the assessment flow rate. The mass flow control system also includes means for controlling a valve of the mass flow controller so the flow rate of the gas through the primary conduit is equal to a set point.

BRIEF DESCRIPTION OF THE DRAWINGS

Various objects and advantages and a more complete understanding of the present invention are apparent and more readily appreciated by reference to the following Detailed Description when taken in conjunction with the accompanying Drawings wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. It is also noted that, as used herein and in the appended claims, the singular forms "a," "an," and "the" include plural referents unless the context clearly dictates otherwise.

Figure 1:
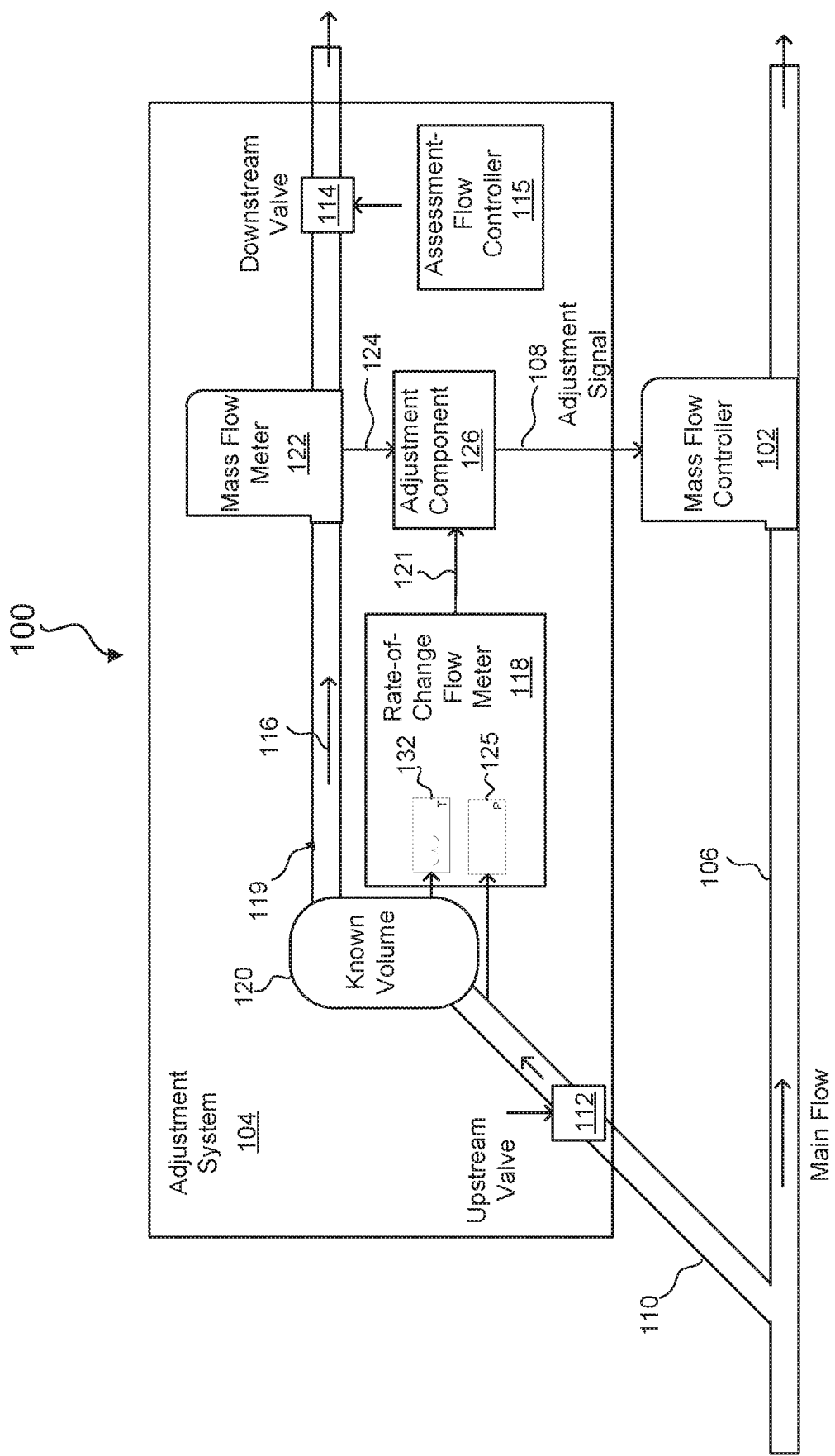
FIG. 1 is a block diagram depicting an embodiment of a mass flow control system.

Referring to FIG. 1, shown is a gas insensitive mass flow control system 100 including a mass flow controller 102 and an adjustment system 104. In general, the mass flow controller 102 operates to control a primary flow rate of a gas that is provided via a primary conduit 106 to another system (not shown) (e.g., a fuel cell system) that uses the gas. As described further herein, an accuracy of a mass flow measurement system (not shown in FIG. 1) of the mass flow controller 102 varies based on a composition of the controlled gas. More specifically, if the chemical composition of the gas fluctuates, such as through contamination of the gas, the accuracy of the control system of the mass flow controller 102 (without an adjustment signal 108 from the adjustment system 104) will vary.

As one of ordinary skill in the art will readily appreciate, the mass flow controller 102 may be calibrated for accuracy with a calibration gas, but if the composition of the controlled gas is different than the calibration gas, the sensing components within the mass flow controller 102 will provide flow signals that inaccurately represent the flow rate of the gas. In some implementations for example, the mass flow controller 102 utilizes thermal mass flow sensor technology, which is affected by the composition of the controlled gas.

The adjustment system 104 generally operates to provide the adjustment signal 108 to the mass flow controller 102 when a composition of the gas changes so that the mass flow controller 102 may accurately meet a set point for the flow of the gas. As shown, the adjustment system 104 is operatively coupled to the primary conduit 106 via a secondary conduit 110. The adjustment system 104 includes a pressurization system that includes an upstream valve 112, a downstream valve 114, and an assessment-flow controller 115 that generally operates to produce an assessment flow 116 through a portion 119 of the secondary conduit 110 that includes a known volume 120.

The adjustment system 104 also includes a rate-of-change flow meter 118 that provides a first measure 121 of the flow rate of the assessment-flow 116, which is substantially independent of the composition of the gas, based upon a rate-of-change of a pressure of the assessment flow 116. In the embodiment depicted in FIG. 1, the rate-of-change flow meter 118 includes a pressure sensor 125 and a temperature sensor 132, and is disposed and configured as a rate-of-decay flow meter in which the upstream valve 112 and a downstream valve 114 are controlled to pressurize the gas in the known volume 120 and then release the pressurized gas to create the assessment flow 116, which has a pressure that is decreasing as the gas exits the known volume 120. When the gas is released, the assessment flow 116 is measured by both the rate-of-change flow meter 118 and a mass flow meter 122.

Similar to the mass flow controller 102, the accuracy of the mass flow meter 122 in this embodiment is also affected by the composition of the gas. As a consequence, the mass flow meter 122 provides a second measure 124 of the flow rate of the assessment-flow 116 that is gas-composition-dependent. In some implementations for example, the mass flow meter 122 and the mass flow controller 102 utilize the same, or very similar, flow-rate-sensing technology so that any gas-composition-related effects on the accuracy of the mass flow controller 102 are mirrored by the mass flow meter 122. In some embodiments, both the mass flow controller 102 and the mass flow meter 122 utilize thermal mass flow sensing technologies.

As shown, an adjustment component 126 is disposed to receive the first measure 121 (gas-composition-independent measure) of the assessment flow rate from the rate-of-change flow meter 118 and the second measure 124 (gas-composition-dependent measure) of the assessment flow rate from the mass flow meter 122, and in response, the adjustment component 126 generates and provides the adjustment signal 108 to the mass flow controller 102. In turn, the mass flow controller 102 uses the adjustment signal 108 (as discussed further herein) to render the control loop of the mass flow controller 102 more accurate.

More specifically, any difference between the first measure 121 (gas-composition-independent measure) and the second measure 124 (gas-composition-dependent measure) indicates the composition of the gas has changed, and that neither the mass flow meter 122 nor the mass flow controller 102 are providing accurate flow rate measurements; thus, the adjustment signal 108 is indicative of changes in the composition of the gas, and hence, an inaccuracy of the mass flow meter 122. And because the changes in the composition of the gas similarly affect both the mass flow meter 122 and the mass flow measurement system of the mass flow controller 102, the adjustment signal 108 (generated based on the inaccuracy of the mass flow meter 122) may be used to correct for inaccuracies of the mass flow controller 102.

It should be recognized that the depiction of the components in FIG. 1 is logical to depict functional aspects of the present embodiment, and it is not intended to convey a particular distribution of physical components. More specifically, the depicted components may be realized by an integrated combination of discrete hardware constructs or may be realized by a collection of distributed hardware constructs. For example, the functions of the rate-of-change flow meter 118, the adjustment component 126, and the assessment-flow controller 115 may be realized (at least in part) by common hardware components. This common hardware may include a processor, memory, and non-transitory processor-executable instructions embodied in non-transitory memory. As another example, the rate-of-change flow meter 118, the adjustment component 126, and the assessment-flow controller 115 may be realized by discrete hardware components such as field programmable gate arrays, application specific integrated circuits, transistor logic, and/or one or more processors in connection with memory and non-transitory processor-executable instructions embodied in non-transitory memory.

It should also be recognized that the known volume 120 depicted in FIG. 1 is intended to convey a known volume that the gas occupies in the secondary conduit—it is not necessarily intended to convey a separate containment vessel. In other words, the known volume 120 may simply be the volume of the second conduit 110 in which the diverted portion of the gas is pressurized. Moreover, one of ordinary skill in the art will recognize that some or all of the components of the adjustment system 104 may be implemented in the same housing as the mass flow controller 102.

In many embodiments, the mass flow controller 102 may have an operating range of at least about 100 liters per minute, and in some embodiments may have an operating range of over about 500 liters per minute. In contrast, the adjustment system 104 may have an operating range of no more than about 800 standard cubic centimeters per minute. In yet other embodiments, the adjustment system 104 has an operating capacity of no more than about 300 standard cubic centimeters per minute. In still other embodiments, the adjustment system 104 has an operating capacity of no more than about 100 standard cubic centimeters per minute. Operating with such a small volume of gas flow allows the adjustment system 104 to exhibit fast response times to changes in the composition of the gas without substantially interrupting the flow of the gas through the primary conduit 106. Put another way, the mass flow controller 102 may have an operating range of between about 120 and 6,000 times over the operating range of the adjustment system 104.

For the purpose of this disclosure, the term "about" should be understood to mean within a range that is either customary for the industry, or within standard manufacturing or process tolerances, whichever is greater. As one example, in some industries, a range of + or −20% is customary, although a manufacturing tolerance might be less.

Figure 2:
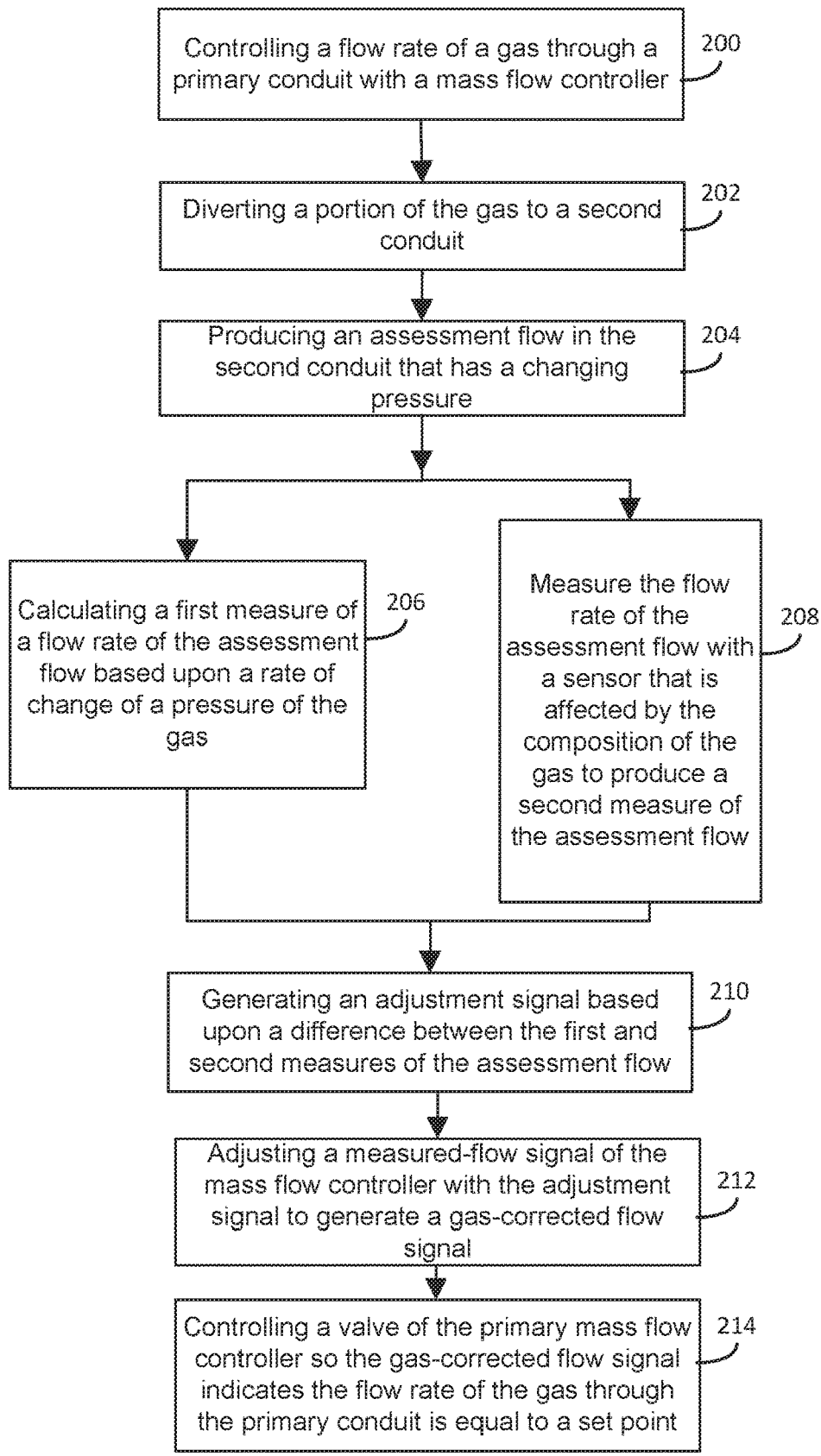
FIG. 2 is a flowchart depicting a method that may be traversed in connection with the mass flow control system of FIG. 1.

While referring to FIG. 1, simultaneous reference is made to FIG. 2, which is a flow chart depicting a method that may be traversed in connection with the system 100 depicted in FIG. 1. As shown, the flow rate of a gas through the primary conduit 106 is controlled by the mass flow controller 102 (Block 200). As discussed above, the gas may be methane gas that is provided to a fuel cell system, but other embodiments are certainly contemplated. In many implementations, the assessment-flow controller 115 generally maintains both the upstream valve 112 and the downstream valve 114 in a closed position, and to determine whether the composition of the gas has changed, and hence, whether the accuracy of the mass flow controller 102 may have changed, a portion of the gas may be diverted to the adjustment system 104 by opening the upstream valve 112 (Block 202). The verification system then produces the assessment flow 116 that has a changing pressure (Block 204).

Although the rate-of-change flow meter 118 may be implemented using either a rate-of-rise or rate-of-decay meter, the mass flow meter 122 depicted in FIG. 1 is disposed downstream relative to the known volume 120 so that the rate-of-change flow meter 118 is disposed to operate as a rate-of-decay meter system. And as implemented in FIG. 1, the pressurization system (including the upstream valve 112, a downstream valve 114, and the assessment-flow controller 115) operates to produce the assessment flow 116 so that the assessment flow 116 has a decreasing pressure.

More specifically, to operate as a rate-of-decay system, the downstream valve 114 is closed while the upstream valve 112 is open to enable the diverted portion of the gas to occupy the known volume 120 of the secondary conduit 110 under pressure. The upstream valve 112 is then closed to isolate the diverted and pressurized portion of the diverted gas from the primary conduit 106 in the known volume 120. The assessment-flow controller 115 then opens the downstream valve 114 while the upstream valve 112 is closed to produce the assessment flow 116 that has a decreasing pressure as the diverted portion of the gas is released from the known volume 120.

As shown in FIG. 2 both the first measure 121 of a flow rate of the assessment flow (based upon a rate of change of a pressure of the gas) and the second measure 124 of the assessment flow 116 are obtained (Blocks 206 and 208), and the adjustment 108 signal is generated based upon a difference between the first measure 121 and the second measure 124 of the assessment flow 116 (Block 210). In the embodiment depicted in FIG. 1, the rate-of-change flow meter 118 calculates the first measure 121 of the flow rate of the assessment flow 116 based upon a rate of change of a pressure of the gas, and the mass flow meter 122 measures the flow rate of the assessment flow with a sensor that is affected by the composition of the gas to produce the second measure 124 of the assessment flow 116 (Block 208).

The adjustment component 126 then generates the adjustment signal 108 based upon a difference between the first measure 121 and the second measure 124 of the assessment flow 116 (Block 210). In one embodiment for example, the adjustment component 126 calculates a difference between the first measure 121 and the second measure 124 and divides the difference by the second measure 124 (the gas-composition-dependent measure) to obtain the adjustment signal 108, which is then provided to the mass flow controller 102 to correct a measured flow signal of the control loop of the mass flow controller 102. In the embodiment depicted in FIG. 1, the effects of the change of the composition of the gas on the mass flow meter 122 generally mirror the effects on the mass flow controller 102. As a consequence, the adjustment signal 108 that is generated based upon an inaccuracy of the mass flow meter 122 may be used to correct errors of the mass flow controller 102.

Figure 3:
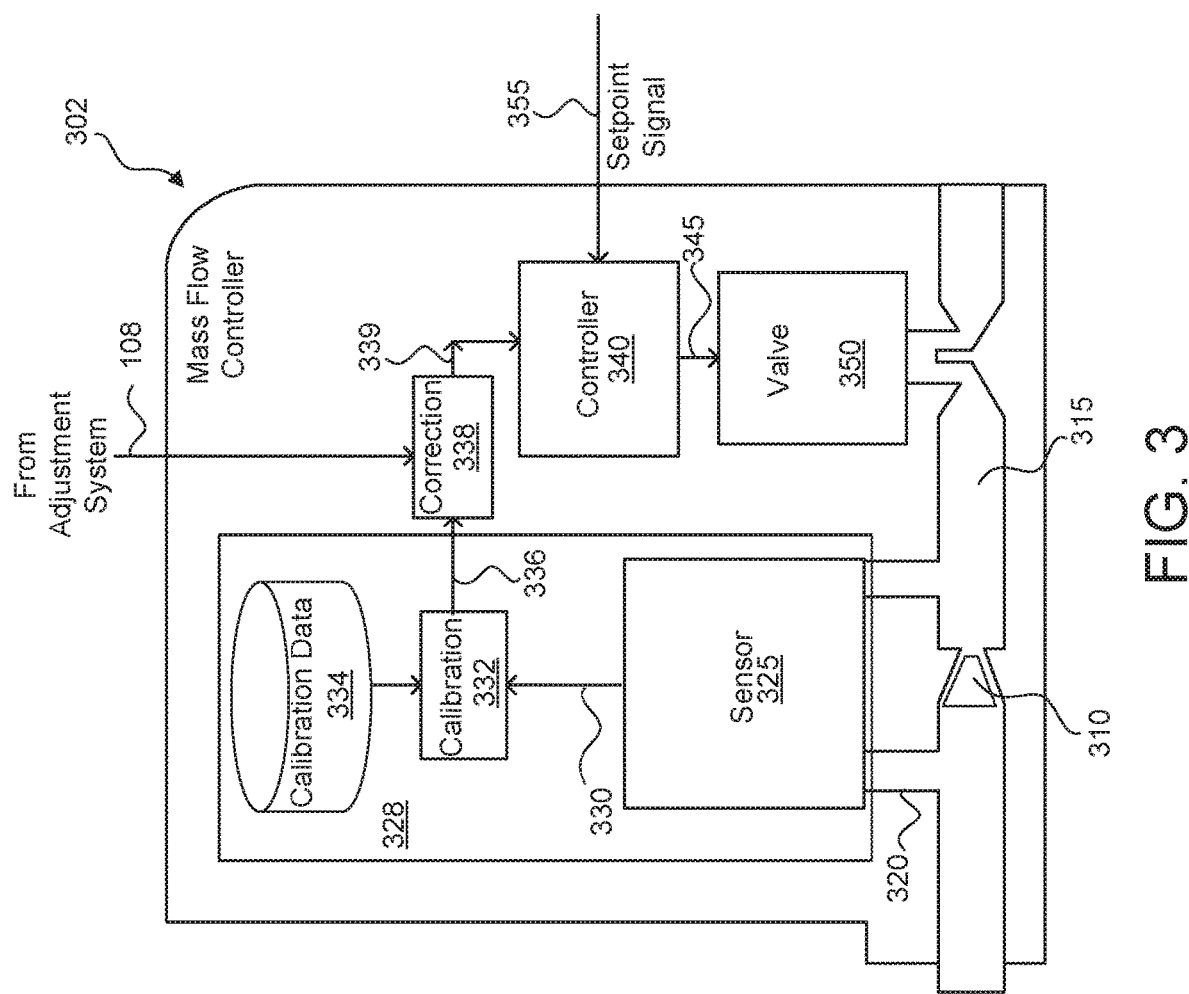
FIG. 3 is a block diagram illustrating further details of an embodiment of the mass flow controller depicted in FIG. 1.

Referring now to FIG. 3, shown is an exemplary mass flow controller (MFC) 302 that may be utilized as the mass flow controller 102 described with reference to FIG. 1. It should be recognized, however, that the MFC 302 is only an example of the types of mass flow controllers that may be implemented as the mass flow controller 102, and that other types of mass flow controllers may be utilized as the mass flow controller 102 in the system 100 depicted in FIG. 1. It should also be recognized that the illustrated arrangement of these components is logical and not meant to be an actual hardware diagram. Thus, the components can be combined, further separated, deleted and/or supplemented in an actual implementation. As one of ordinary skill in the art will appreciate, the components depicted in FIG. 3 may be implemented in hardware, firmware, software, or any combination thereof. Moreover, in light of this specification, the construction of each individual component is well known within the skill of those of ordinary skill in the art.

As depicted, a base of the MFC 302 includes bypass 310 through which a gas flows. The bypass 310 directs a constant proportion of gas through main path 315 and sensor tube 320. As a consequence, the flow rate of the fluid (e.g., gas or liquid) through the sensor tube 320 is indicative of the flow rate of the fluid flowing through the main path 315 of the MFC 302.

In this embodiment, the sensor tube 320 is a small-bore tube that is part of a thermal mass flow sensor 325 of the MFC 302. In general, the thermal mass flow sensor 325 is configured to provide an output signal 330, which is a digital signal that is indicative of the flow rate through the sensor tube 320, and hence, indicative of the flow rate through the main path 315 of the MFC 302. As one of ordinary skill in the art will readily appreciate, a variety of different technologies including bridge-disposed resistance-thermometer elements (e.g., coils of conductive wire), resistance temperature detectors (RTD), and thermocouples in connection with analog, analog-to-digital, and digital processing technologies may be used realize the thermal mass flow sensor 325. As shown, the output signal 330 in this embodiment is received by a calibration component 332 that tunes the signal 330 by adjusting the signal 330 using predetermined calibration data 334 that was generated during a calibration process (e.g., by a manufacturer of the MFC 302) using a calibration gas (e.g., nitrogen) so that a measured-flow signal 336 provides an accurate representation of a flow rate of the calibration gas through the MFC 302 under a variety of operating conditions (e.g., under a variety of temperatures and set points).

But when the composition of the gas changes from the calibration gas, the measured-flow signal 336 may become inaccurate, i.e., an accuracy of the measured-flow signal 336 is dependent upon the composition of the controlled gas. As a consequence, and as shown in FIG. 2, in this embodiment the adjustment signal 108 from the adjustment system 104 is utilized by a correction module 338 to adjust the measured-flow signal 336 to generate a gas-corrected flow signal 339 (Block 212).

The controller 340 along with the thermal mass flow sensor 325, the calibration component 332, and the correction module 338 in this embodiment are part of a control loop that operates to generate a control signal 345 to control a position of the control valve 350 based upon the gas-corrected flow signal 339 to provide a flow rate that is indicated by a set point signal 355. In other words, the controller 340 is configured to control the valve 350 so the gas-corrected flow signal 339 indicates the primary flow rate of the gas through the primary conduit 106 is equal to a set point (as indicated by the set point signal 355). For example, the flow rate may exceed 100 liters per minute, but the flow rate will vary depending upon the set point signal 355. The control valve 350 may be realized by a piezoelectric valve or solenoid valve, and the control signal 345 may be a voltage (in the case of a piezoelectric valve) or current (in the case of a solenoid valve). Although not depicted, the controller 340 also utilizes temperature and pressure inputs to more accurately control the flow rate. Both pressure and temperature sensors and corresponding implementations in the context of mass flow controllers are well known to those of ordinary skill in the art, and as a consequence, details of temperature and pressure sensor systems are not included herein.

Figure 4A:
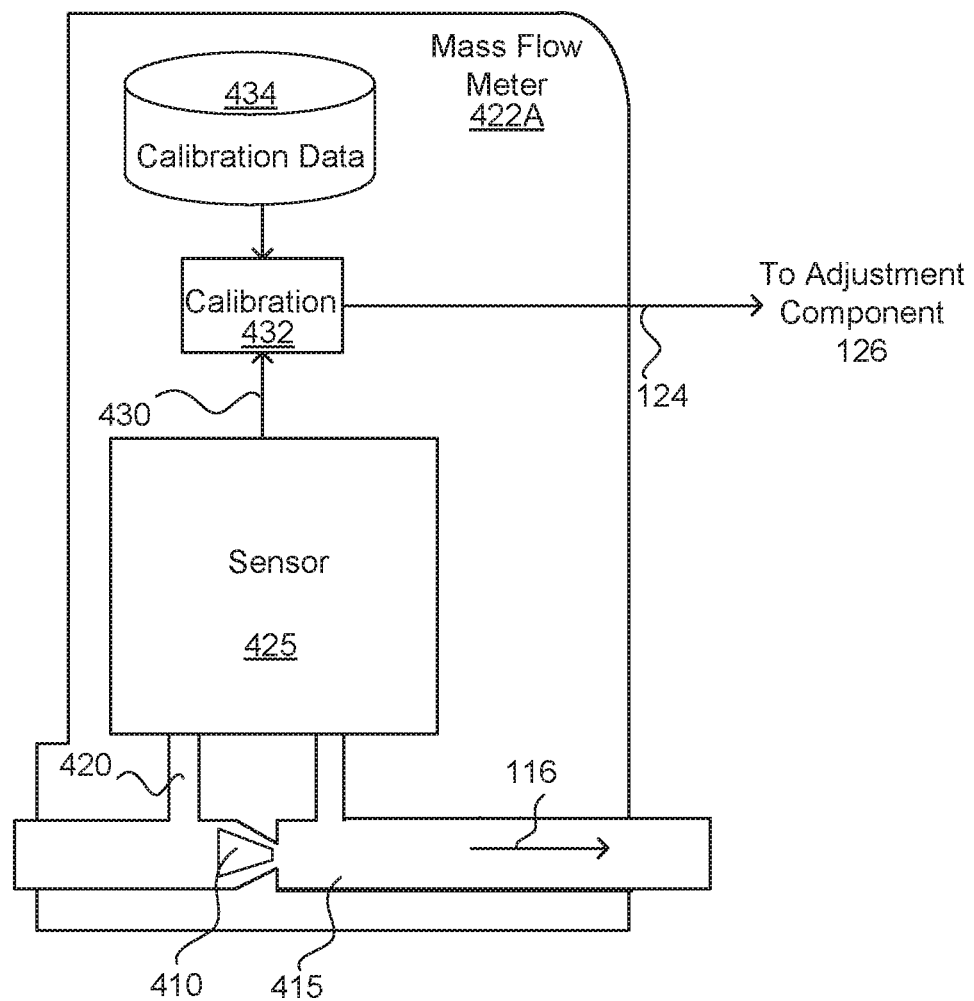
FIG. 4A is a block diagram depicting an embodiment of the mass flow meter of FIG. 1.
Figure 4B:
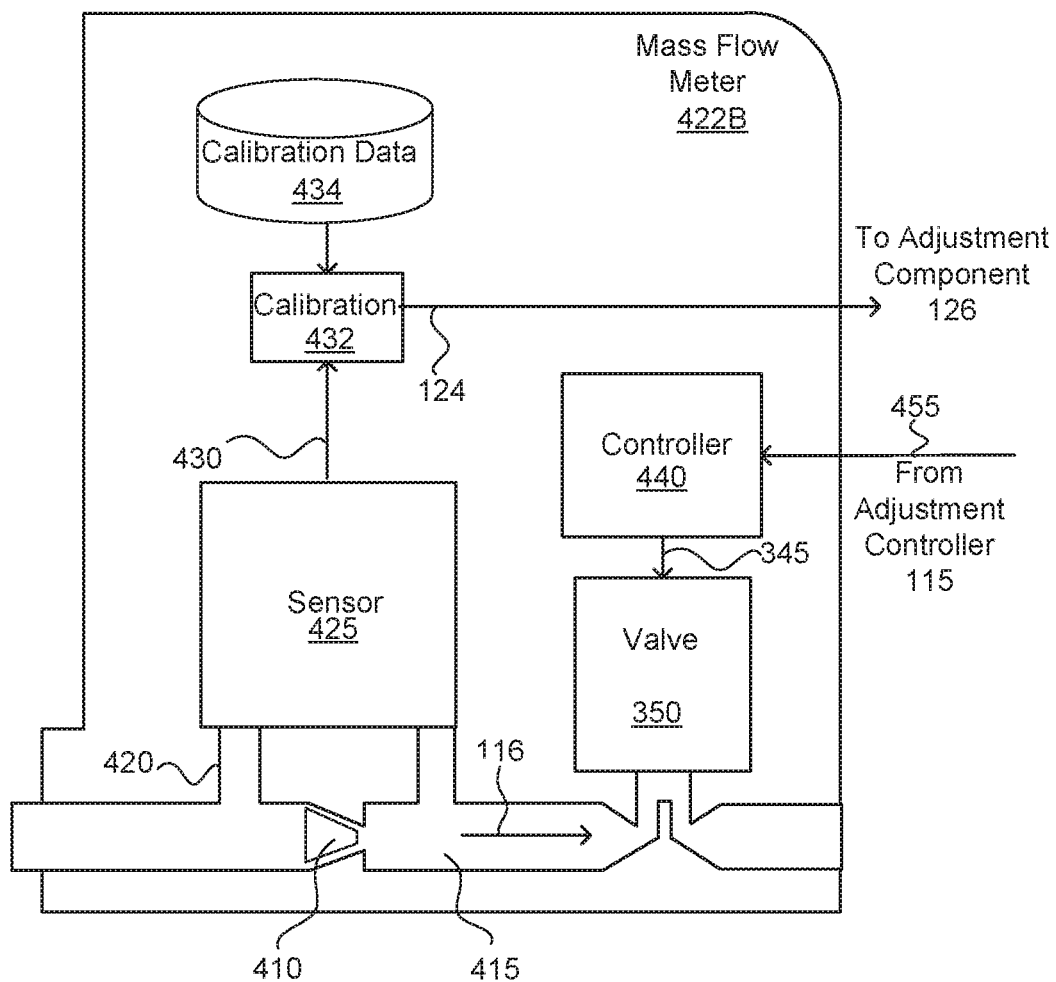
FIG. 4B is a block diagram depicting another embodiment of the mass flow meter of FIG. 1.

Referring next to FIGS. 4A and 4B, shown are block diagrams depicting exemplary mass flow meters 422A and 422B, respectively, which may be utilized to realize the mass flow meter 122 described with reference to FIG. 1. Although not required, in the context of the embodiment described with reference to FIG. 1, several aspects of the mass flow meters 422A, 422B utilize the same technology as the mass flow controller 102 depicted in FIG. 1. More specifically, both the sensors 325, 425 may be thermal mass flow sensors, and the bypass 410 directs a constant proportion of the assessment flow 116 through a main path 415 and sensor tube 420 in the same way the bypass 310 directs a constant proportion of the primary gas flow through the main path 315 and sensor tube 320 of the mass flow controller 302. As a consequence, the mass flow meters 422A, 422B closely represent the mass flow measurement system 328 of the mass flow controller 302; thus, changes in the sensor signal 330 of the mass flow controller 302 due to changes in the gas composition will similarly occur to the sensor signal 430 of the mass flow meters 422A, 422B.

As depicted, the mass flow meters 422A, 422B may also have a calibration component 432 and calibration data 434 that function in the same way as the calibration component 332 and calibration data 334 of the mass flow controller 302 to provide a calibrated flow signal that is a gas-composition-dependent measure 124 of the assessment flow 116.

The mass flow meter 422B depicted in FIG. 4B differs from the mass flow meter 422A in FIG. 4A in that it includes a control valve 350 to operate as a restriction to ensure that a flow rate of the assessment flow 116 is within a range of the sensor 425 and to create a pressure at the sensor 425 that is close to a pressure of the gas in the known volume 120 (as opposed to the pressure at an outlet of the adjustment system 104, which may be a vacuum). A controller 440 of the mass flow meter 422B may also receive a signal 455 from the assessment-flow controller 115 to open and close the control valve 350; thus the control valve 350 may replace the downstream valve 114, i.e., the control valve 350 may be controlled in the same way as the downstream valve 114 (described with reference to FIG. 1) to produce the assessment flow 116. In other embodiments, flow restriction may be created by a control valve (or any other flow restriction component that limits flow through the mass flow meter 422) located anywhere between the known volume 120 and an outlet of the adjustment system 104.

Figure 5:
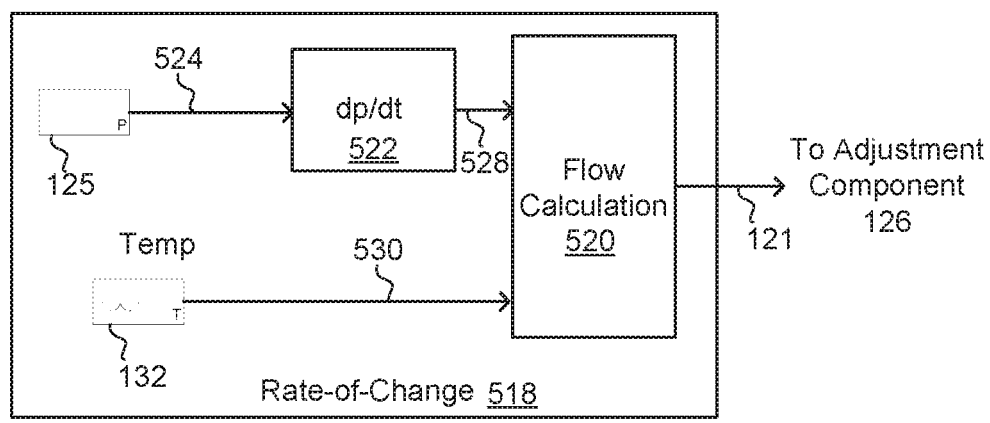
FIG. 5 is a block diagram depicting an embodiment of the rate-of-change meter depicted in FIG. 1.

Referring next to FIG. 5, shown is a block diagram of a rate-of-change meter system 518 that may be utilized to implement the rate-of-change meter system 118 depicted in FIG. 1. As shown, the rate-of-change meter system 518 includes a flow calculation component 520 that provides the first measure 121 (a gas-composition-independent measure) of the assessment flow 116. And as shown, a rate-of-pressure-change component 522 receives a pressure signal 524 from the pressure sensor 125, and in response, provides a rate-of-change signal 528 to the flow calculation component 520. In addition, the flow calculation component 520 receives a temperature signal 530 from a temperature sensor 132.

The depiction of the components in FIG. 5 is logical to depict functional aspects of the rate-of-change component 518 and is not intended to be a hardware representation. More specifically, the depicted flow calculation component 520 and rate-of-pressure-change component 522 may be realized by hardware or hardware in connection with software. As one of ordinary skill in the art will appreciate for example, the rate-of-pressure-change component 522 may be realized by a combination of analog and digital components to sample the pressure signal 524 (e.g., a voltage signal), and store digitized samples of the pressure signal 524 to enable the rate-of-change of the pressure in the known volume 120 to be calculated based upon changes to the pressure of the assessment flow 116 over time.

In operation, the flow calculation component 520 calculates the first measure 121 (the gas-composition-independent measure) of the assessment flow 116 based upon the rate-of-change signal 528, the temperature signal 530, and the known volume 120. For example, the flow calculation component 520 may use the ideal gas law to calculate the flow rate of the assessment flow 116. More specifically, the assessment flow 116 may be calculated as:

$$AF = \frac{d(p/T)}{dt} * \frac{T_s * V}{P_s * R},$$

wherein
AF is the assessment flow;
T and P are gas temperature and gas pressure measurements, respectively;

$T_s$ and $P_s$ are standard temperature (273.15K) and standard pressure (101.3 kPa), respectively;

V is the known volume; and

R is the universal gas constant (8.31441 J K$^{-1}$).

Figure 6:
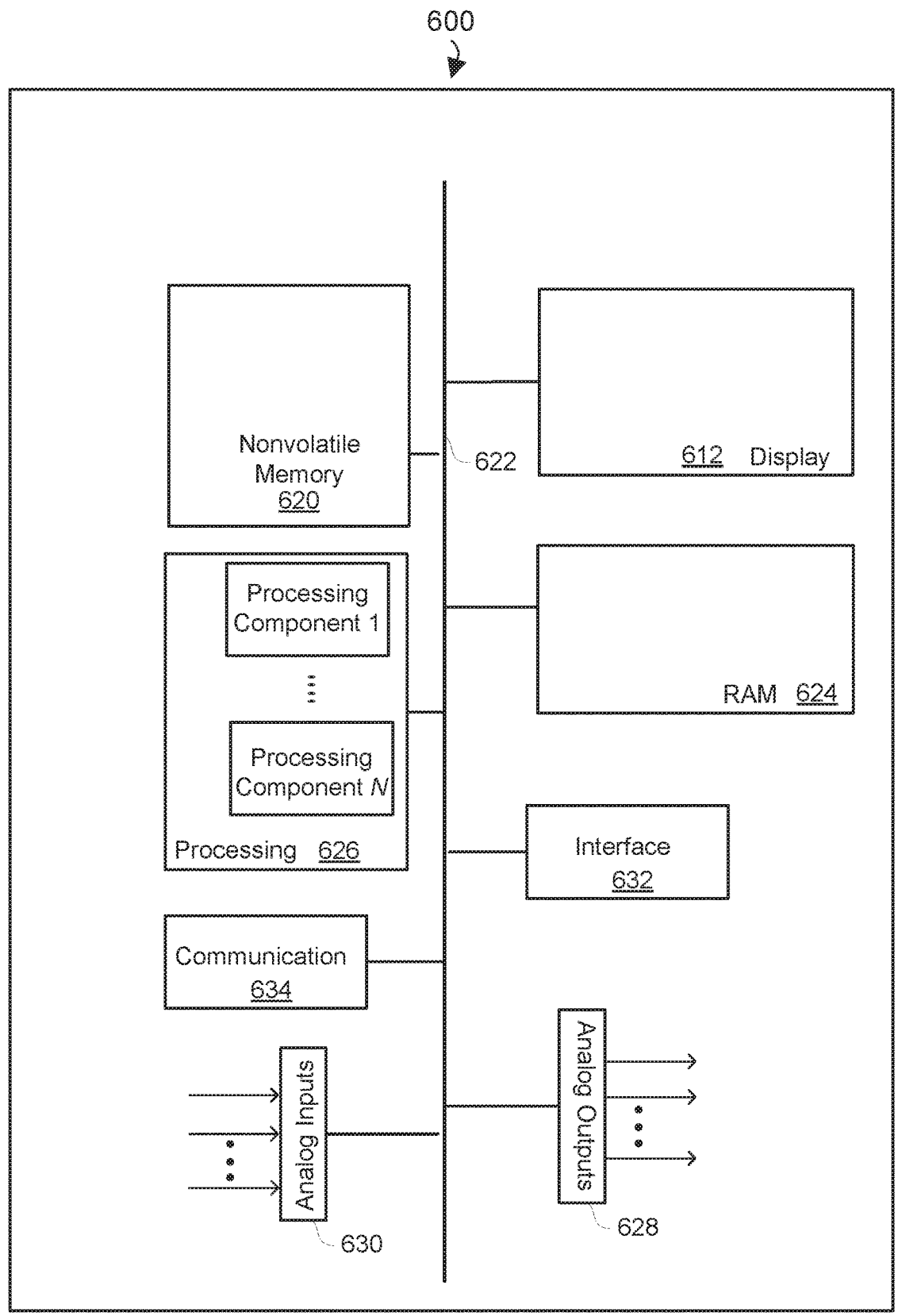
FIG. 6 is a diagram depicting physical components that may be utilized to realize one or more components described herein.
Figure 7:
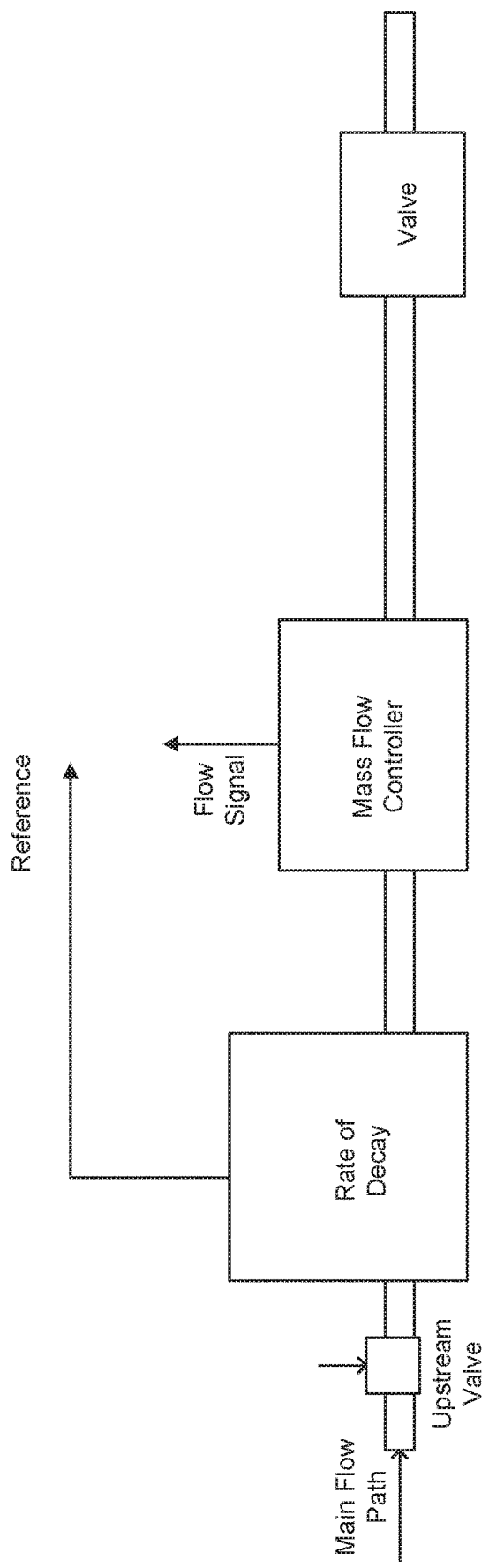
FIG. 7 is a block diagram depicting aspects of prior art.

Referring next to FIG. 6, shown is a block diagram of a computing system 600 depicting physical components that may be utilized to realize the gas insensitive mass flow control system 100 described with reference to FIG. 1. As shown, a display portion 612, and a nonvolatile memory 620 are coupled to a bus 622 that is also coupled to a random access memory ("RAM") 624, a processing portion (which includes N processing components) 626, a collection of analog outputs 628, and a collection of analog inputs 630. Although the components depicted in FIG. 6 represent physical components, it should be recognized that the depicted computing system may be replicated and distributed to implement the components depicted in FIG. 1.

The display portion 612 generally operates to provide a presentation of content to a user, and in several implementations, the display is realized by an LCD or OLED display. In general, the nonvolatile memory 620 functions to store (e.g., persistently store) data and executable code including non-transitory processor-executable code that is associated with the functional components depicted in FIG. 1. In some embodiments for example, the nonvolatile memory 620 includes bootloader code, software, operating system code, file system code, and code to facilitate the method described with reference to FIG. 2.

In many implementations, the nonvolatile memory 620 is realized by a flash memory (e.g., NAND or ONENAND™ memory), but it is certainly contemplated that other memory types may be utilized as well. Although it may be possible to execute the code from the nonvolatile memory 620, the executable code in the nonvolatile memory 620 is typically loaded into the RAM 624 and executed by one or more of the N processing components in the processing portion 626.

The N processing components in connection with the RAM 624 generally operate to execute the instructions stored in the nonvolatile memory 620 to effectuate the functional components depicted in FIG. 1. For example, the assessment-flow controller 115, and logical aspects of the rate-of-change flow meter system 118, mass flow controller 102, mass flow meter 122, and adjustment component 126 may be realized by one or more of the N processing components in connection with non-transitory processor-readable code that is executed from the RAM 624. And the calibration data 334, 434 may be stored in the non-volatile memory 620.

An interface component 632 generally represents one or more components that enable a user to interact with the gas insensitive mass flow control system 100. The interface component 632, for example, may include a keypad, touch screen, and one or more analog or digital controls, and the interface component 632 may be used to translate an input from a user into the set point signal 355. And a communication component 634 generally enables the gas insensitive mass flow control system 100 to communicate with external networks and devices including the external processing components (e.g., a fuel cell system). One of ordinary skill in the art will appreciate that the communication component 634 may include components (e.g., that are integrated or distributed) to enable a variety of wireless (e.g., WiFi) and wired (e.g., Ethernet) communications.

Exemplary Fuel Cell Application

A fuel cell is a device that converts the chemical energy from a fuel into electricity through a chemical reaction with oxygen or another oxidizing agent. Fuel cells are different from batteries in that they require a continuous source of fuel to sustain the chemical reaction, whereas in a battery the chemicals present in the battery react with each other to generate an electromotive force. Fuel cells can produce electricity continuously for as long as the fuel is supplied.

A typical mass flow controller may be used to approximately maintain the flow of a fuel to a set point. But in practice, the chemical composition of the supply gas fluctuates, such as through contamination of the gas, and affects the efficiency of the fuel cell. The typical mass flow controller, not being responsive to these fluctuations, allows a less than optimized energy output to result. To counteract this change in energy output, the fuel cell industry is generally limited to measuring the fuel cell energy output and, based on the measurements, adjusting the flow of gas delivery. This process does not maximize the energy efficiency of the fuel cells because it causes delays in responding to changes in the composition of the supply gas.

In the context of prior art fuel cell systems, if the primary gas became contaminated, affecting energy output of the fuel cell, the systems were disabled, and recalibrated. This practice leads to undesirable inefficiencies in the system, and to overcome these deficiencies, the gas insensitive mass flow control system 100 may be used as a system that is insensitive to the gas species. Beneficially, the system 100 provides a fuel cell operator with the ability to adjust a set point (with the set point signal 355) of the mass flow controller 102 in response to changes in the process gas without interrupting plant operations.

The mass flow controller 102 is responsive to the adjustment signal 108, and may control flow of the primary gas $G_p$ (e.g., methane) to an accuracy of within 0.5% of the set point. The system 100 thus overcomes the problem of impurities, including butane and other hydrocarbons, being introduced to the primary gas $G_p$. This responsiveness maximizes efficiency of a fuel cell system and eliminates the need for shutting down the fuel cell process to calibrate the mass flow controller 102 in response to a new gas species.

For example, at start-up, the calibration data 334 of the mass flow controller 102 may be generated to calibrate the mass flow controller 102 relative to methane gas. After start-up, however, the supply of methane may become tainted with impurities; thus, effectively creating a new gas species as the primary gas $G_p$, and causing the readings of the mass flow controller 102 to be inaccurate—not because of a defect in the mass flow controller 102, but because of a change in the properties of the fluid passing through the mass flow controller 102.

Using the adjustment system 104 as described herein, a deviation in the composition of the controlled fuel from an expected or desired composition will prompt a change in the adjustment signal 108. The mass flow controller 102, in turn, is responsive (as discussed above) to the adjustment signal 108 to account for the impurities.

It should be understood that the above adjustment process may be repeated continuously or periodically as desired. For example, if the primary fluid or gas $G_p$ is being drawn from a storage vessel, the operator may assume that the primary fluid or gas $G_p$ does not change over time, and a single adjustment step when the sealed storage vessel is initially brought on-line may be all that is necessary. In contrast, if the primary fluid or gas $G_p$ is being drawn from a public utilities line, the operator may assume that the primary fluid or gas $G_p$ changes often over time, and regular verification and adjustment steps may be necessary, such as every several minutes, hours, days, etc. As another example, such as where the fuel cell energy generation process is particularly sensitive to fluctuations in the primary fluid or gas $G_p$, the operator may wish to perform continuous adjustments to maximize efficiency of the fuel cell energy generation.

It should be reiterated that the adjustment system 104 may have a much smaller capacity or chamber than the mass flow controller 102. Specifically, while the mass flow controller 102 and primary conduit 106 have an operating capacity of at least about 100 liters per minute, or, in some embodiments, an operating capacity of at least about 500 liters per minute, the adjustment system 104 has an operating capacity of no more than about 800 standard cubic centimeters per minute.

In some embodiments, the assessment flow 116 is released to atmosphere or an empty chamber after passing through the downstream valve 114, while, in others, the assessment flow 116 is returned to the primary conduit 106.

The various illustrative logical blocks, modules, and circuits described in connection with the embodiments disclosed herein may be implemented or performed with general purpose processors in connection with RAM and non-transitory memory as depicted in FIG. 6, and/or an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a digital signal processor (DSP) and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor (e.g., as shown in FIG. 6), or in a combination of the two. A software module may reside in non-transitory processor readable mediums such as RAM memory, flash memory, ROM memory, EPROM memory, EEPROM memory, registers, hard disk, a removable disk, a CD-ROM, or any other form of storage medium known in the art. An exemplary storage medium is coupled to the processor that can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

In conclusion, the present invention provides, among other things, a system and method for controlling a mass flow rate of a fluid. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A mass flow control system comprising:
 a primary conduit for directing a flow of a gas;
 an adjustment system coupled to the primary conduit via a secondary conduit with a known volume, the adjustment system is configured to divert a portion of the gas from the primary conduit to the secondary conduit and provide an adjustment signal that changes when a composition of the gas changes;
 a mass flow controller operatively coupled to the primary conduit to control a primary flow rate of the gas, wherein the mass flow controller includes:
  a valve disposed in the primary conduit to control the primary flow rate of the gas through the primary conduit; and
  a control loop configured to receive the adjustment signal and control the valve so a primary flow rate of the gas through the primary conduit is equal to a set point.

2. The mass flow control system of claim 1, wherein the mass flow controller has an operating range of at least 100 liters per minute.

3. The mass flow control system of claim 1, including:
 means for providing a first measure of an assessment flow rate of an assessment flow in the second conduit, wherein the first measure of the assessment flow rate is a composition-independent measure of the assessment flow;
 means for providing a second measure of the assessment flow rate of the assessment flow through the secondary conduit; and
 an adjustment component to generate the adjustment signal based upon a difference between the first measure and the second measure of the assessment flow rate.

4. The mass flow control system of claim 3, including:
 a pressurization system to produce the assessment flow in the secondary conduit that has a changing pressure in the known volume of the secondary conduit;
 wherein the means for providing the first measure of the assessment flow rate includes a rate-of-change flow meter to provide, based upon a rate of change of a pressure of the assessment flow, the first measure of the assessment flow rate of the assessment flow.

5. The mass flow control system of claim 4, wherein both the means for providing the second measure of the assessment flow rate and the control loop each include a thermal mass flow sensor.

6. The mass flow control system of claim 5, wherein the pressurization system includes:
 an upstream valve and a downstream valve disposed within the secondary conduit, wherein the thermal mass flow sensor of the means for providing the second measure of the assessment flow rate and the rate of change meter are disposed between the upstream valve and the downstream valve;
 wherein the pressurization system includes an assessment-flow controller configured to:
  open the upstream valve to divert the portion of the gas from the primary conduit to the secondary conduit and close the downstream valve to pressurize the gas;

close the upstream valve while the downstream valve is closed to trap the pressurized gas in a portion of the secondary conduit that includes the known volume; and open the downstream valve while the upstream valve is closed to produce the assessment-flow that has the changing pressure.

7. The mass flow control system of claim 6, wherein the assessment-flow controller includes a processor and non-transitory memory encoded with instructions to open and close the upstream and downstream valves to produce the assessment flow.

8. The mass flow control system of claim 6, wherein the assessment-flow controller includes hardware to open and close the upstream and downstream valves to produce the assessment flow, wherein the hardware includes one or more of an FPGA, an ASIC, a programmable logic device, and discrete gate or transistor logic devices.

9. A mass flow control system comprising:
   means for controlling the flow rate of the gas through a primary conduit with a mass flow controller;
   means for diverting a portion of the gas to a second conduit with a known volume;
   means for producing an assessment flow in the second conduit;
   means for measuring a flow rate of an assessment flow in the second conduit that is a composition-independent measure of the assessment flow;
   means for measuring the flow rate of the assessment flow with a mass flow meter that is affected by the composition of the gas to produce a second measure of the assessment flow;
   means for generating an adjustment signal based upon a difference between the first measure and the second measure of the assessment flow rate; and
   means for controlling a valve of the mass flow controller with the adjustment signal so the flow rate of the gas through the primary conduit is equal to a set point.

10. The mass flow control system of claim 9, wherein the means for controlling the flow rate of the gas through a primary conduit with a mass flow controller includes means for controlling the flow rate of the gas to be at least 100 liters per minute.

11. The mass flow control system of claim 9, wherein the means for producing the assessment flow includes:
   means for opening an upstream valve in the second conduit to divert the portion of the gas from the primary conduit to the secondary conduit and closing the downstream valve to pressurize the gas;
   means for closing the upstream valve while the downstream valve is closed to trap the pressurized gas in a portion of the secondary conduit that includes the known volume; and
   means for opening the downstream valve while the upstream valve is closed to produce the assessment-flow that has the changing pressure.

12. The mass flow control system of claim 9, wherein:
   the means for producing an assessment flow in the second conduit includes means for producing the assessment flow that has a changing pressure in the known volume of the second conduit; and
   the means for measuring a flow rate of an assessment flow in the second conduit that is a composition-independent measure of the assessment flow includes means for calculating the flow rate of the assessment flow based upon a rate-of-change of the changing pressure of the assessment flow.

* * * * *